United States Patent Office 2,918,180
Patented Dec. 22, 1959

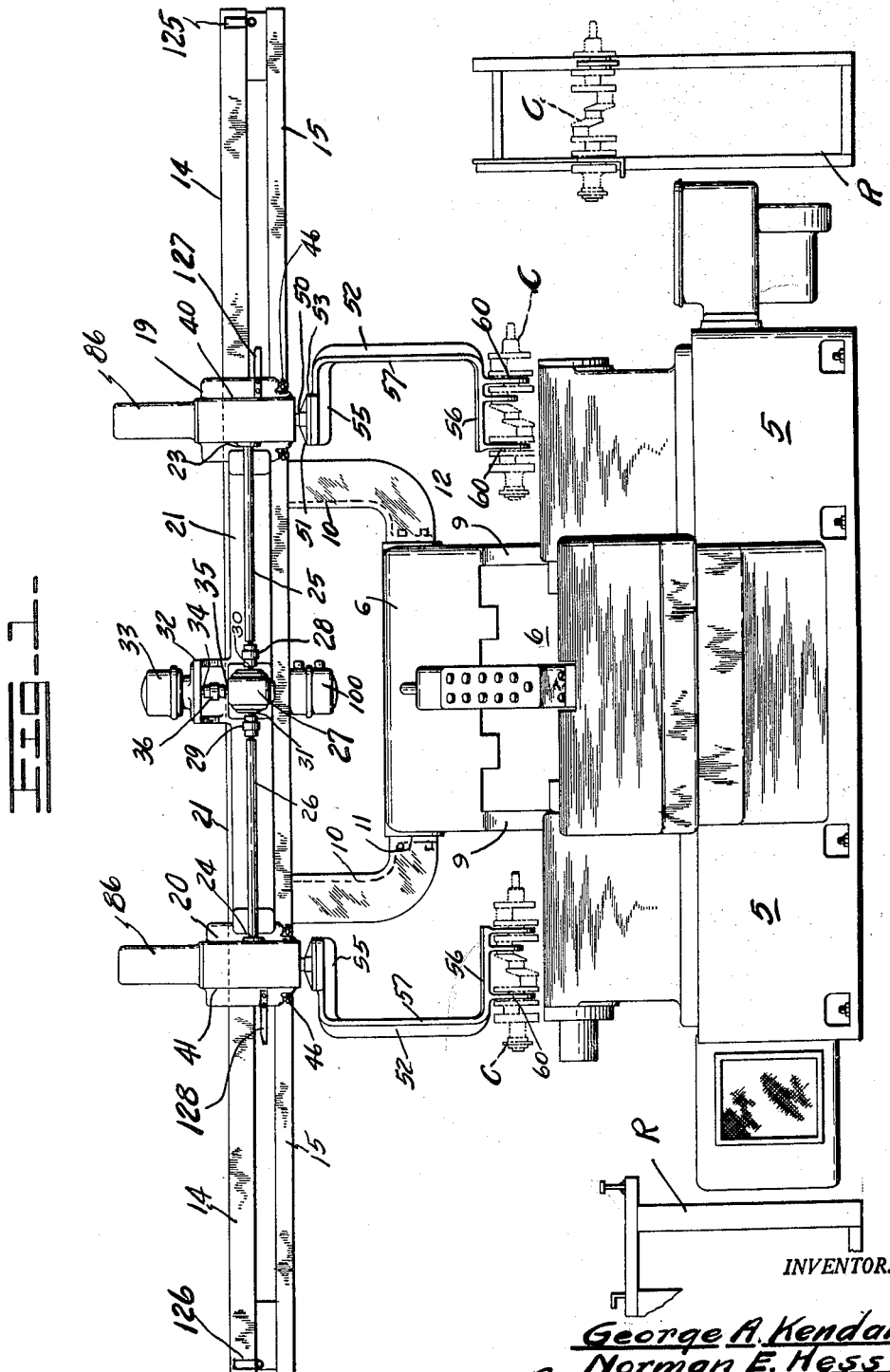

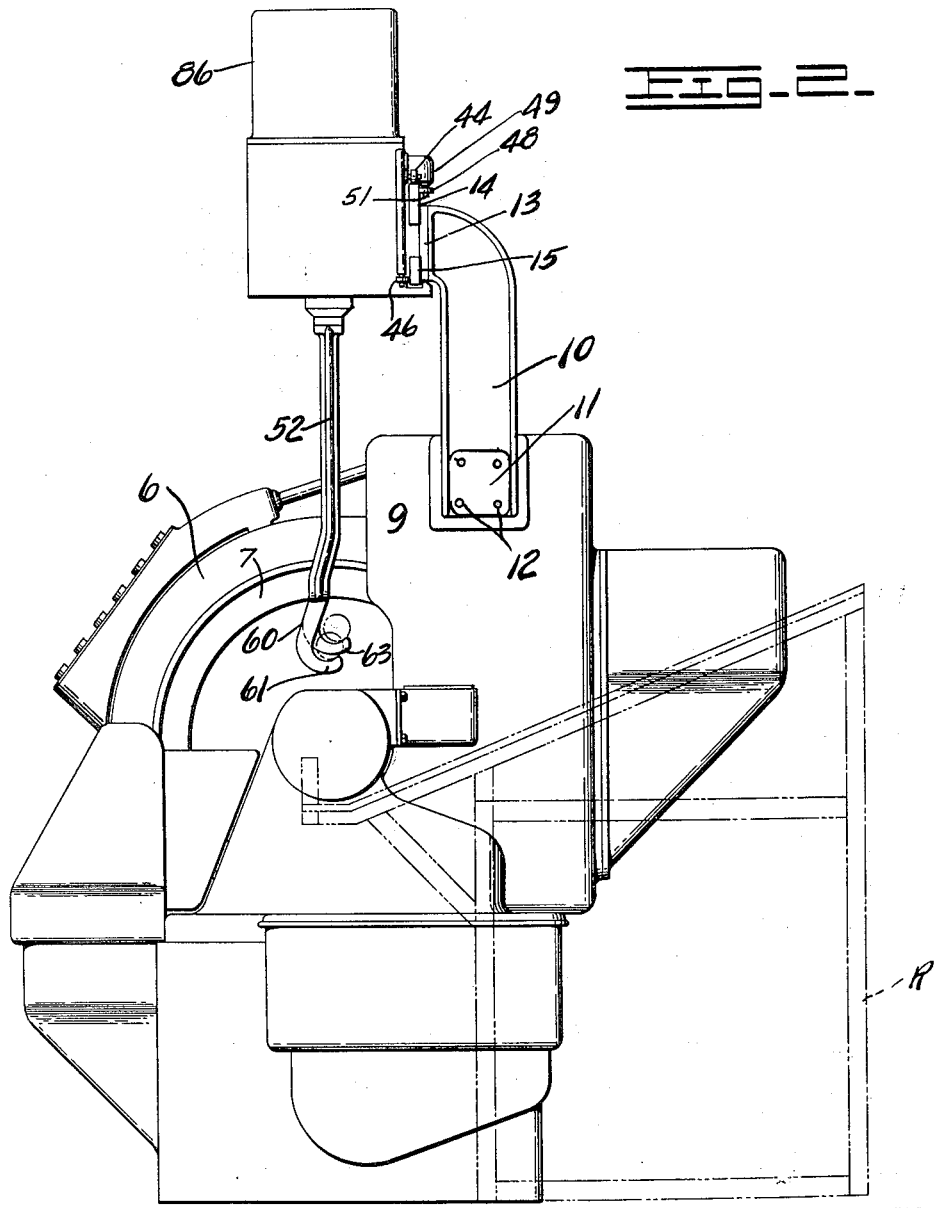

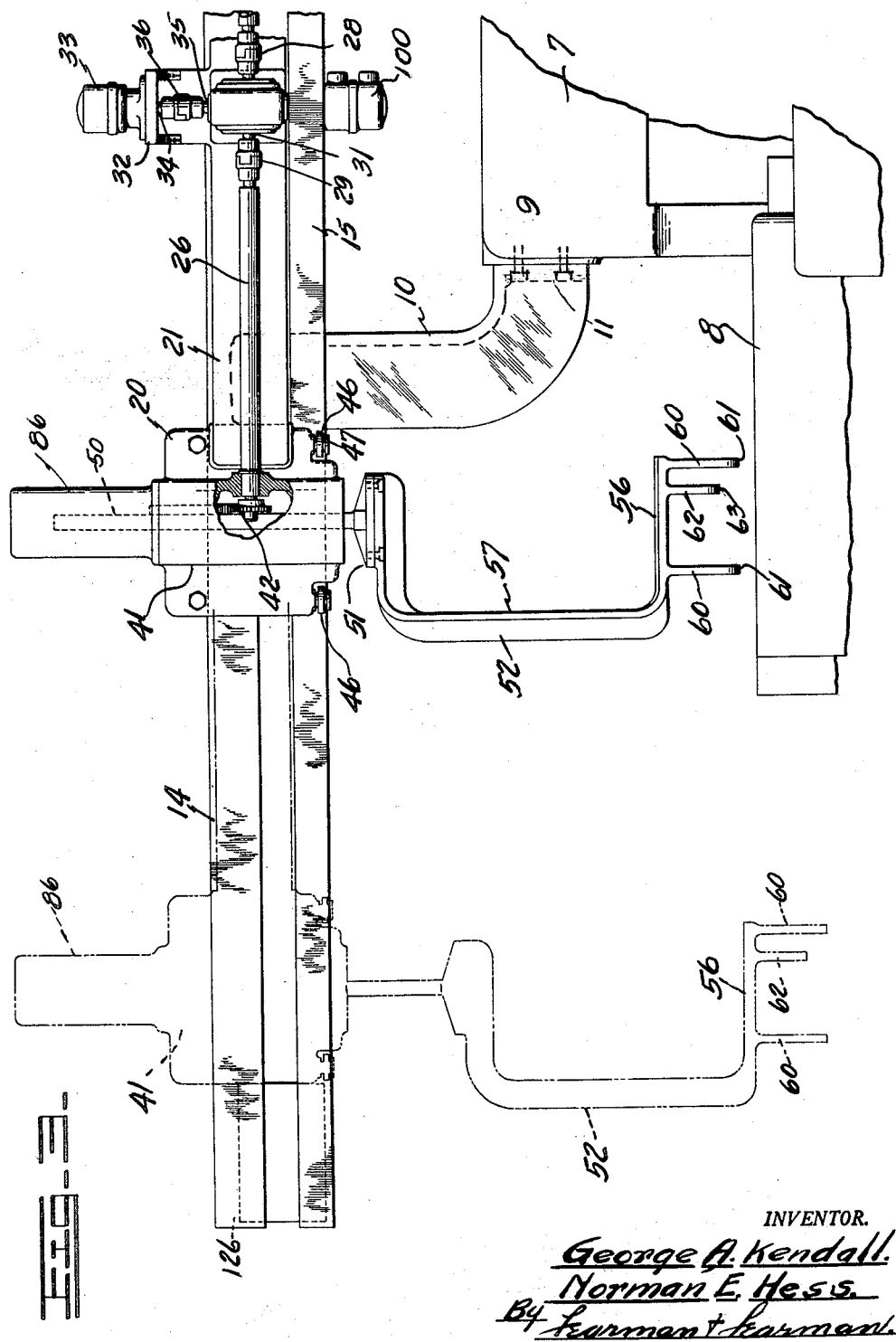

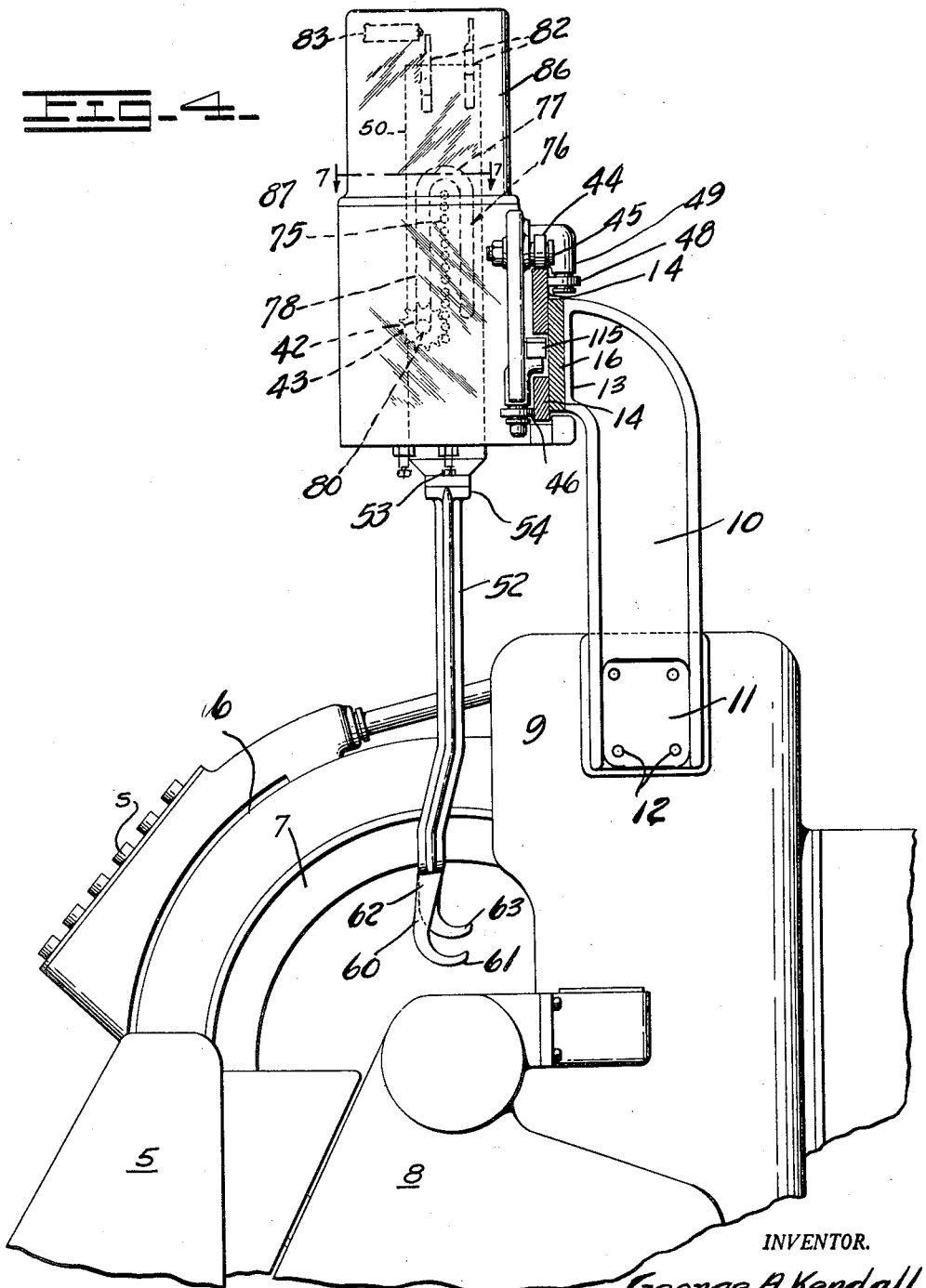

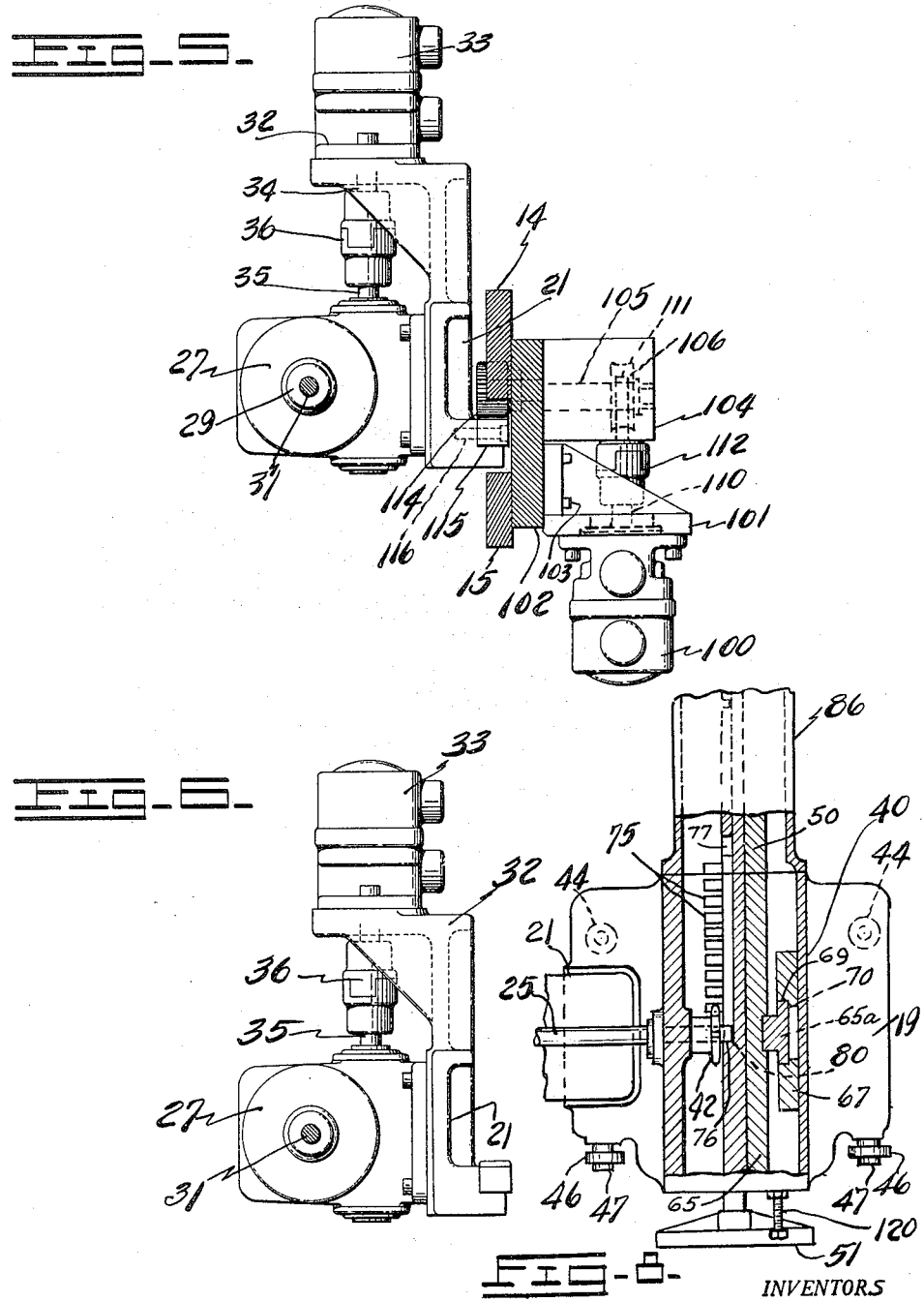

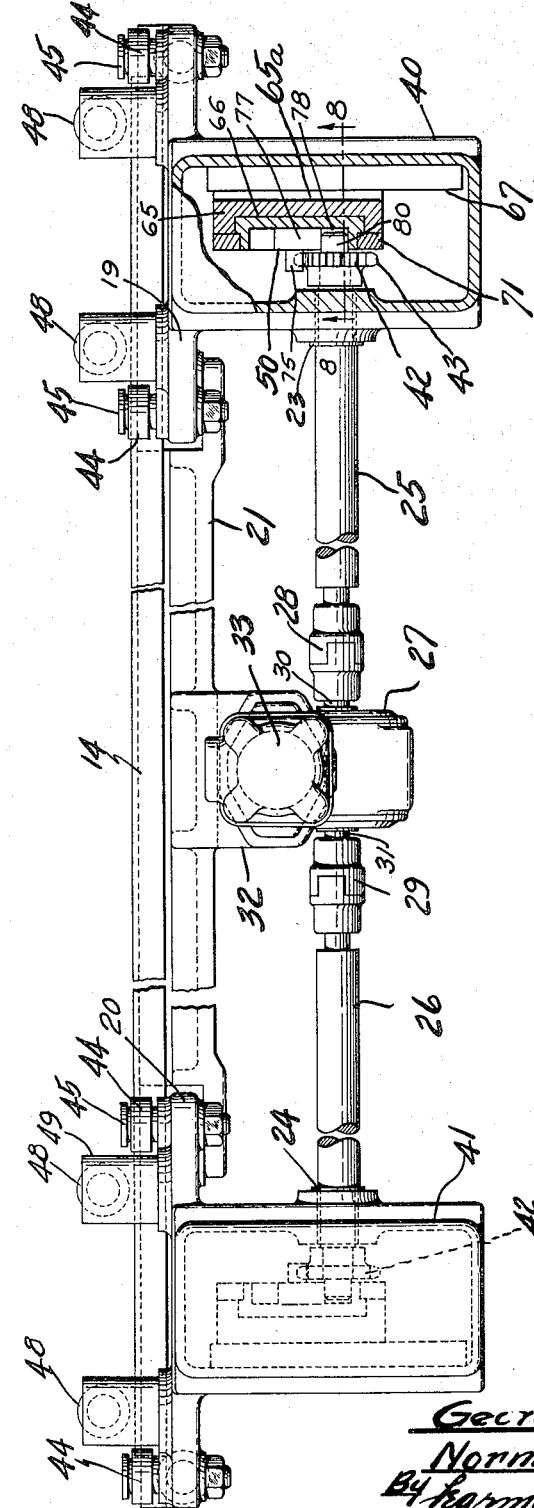

2,918,180
WORKPIECE HANDLING APPARATUS FOR
CENTER DRIVE CRANKSHAFT LATHES

George A. Kendall and Norman E. Hess, Saginaw, Mich., assignors to Wickes Machine Tool, Division of The Wickes Corporation, a corporation of Michigan Application December 28, 1954, Serial No. 477,974

3 Claims. (Cl. 212—128)

The present invention relates to improvements in workpiece handling apparatus for center drive crankshaft lathes, and more especially to a loading and unloading mechanism therefor.

One object of the invention, is to provide a pair of loading cranes which are operated to load and unload an automatic crankshaft lathe of the center drive type.

Another object is to provide loading and unloading cranes which are guided positively through a course of travel such that the hooked ends of the crane will engage and disengage the crankshaft bearing portions by a controlled travel in a direction radial to the axis of the crankshaft in a horizontal plane.

Another object is to provide a loading and unloading apparatus in which the workpiece engaging hooks are operated through a predetermined course of travel in a positive manner to engage the workpiece and feed it to the center drive of the lathe so that the movable tail stocks can engage the workpiece and the crane hooks can disengage without interrupting the operation of the tail stocks. The radial horizontal movement of the work engaging hooks being controlled within a limit such that the hooks will not engage any part of the center drive or tail stocks during the feeding and unloading operations.

Another object is to provide a loading and unloading apparatus for a center drive crankshaft lathe in which the crane hooks travel along a predetermined path radially with respect to the axis of the crankshaft and are mounted on a cross slide to permit the horizontal movement in timed relation to the vertical reciprocating movement thereof.

Another object is to provide a work handling apparatus for a center drive crankshaft lathe in which the crane hooks are arranged in pairs with a common motor drivingly connected to each of said crane hooks and arranged to move the same in unison such that one crane hook will pick up a crankshaft from a loading station and feed it to the center drive chucking device of the lathe, while the other crane hook has previously removed a finished crankshaft from between the tail stocks and chucking device and has deposited it upon a work rest.

Other objects and advantages of the invention will become apparent during the course of the following description of the accompanying drawings wherein:

Figure 1 is a front elevational view of a center drive crankshaft lathe showing the loading and unloading apparatus attached thereto.

Figure 2 is an end elevational view of the lathe showing in broken lines the inclined gravity conveyor for feeding the "work" to the work engaging hooks.

Figure 3 is an enlarged, fragmentary, front elevational view illustrating the hook traveling mechanism etc., the broken lines illustrating the hook travel.

Figure 4 is an end elevational view, partly in section and showing the manner in which the work engaging hooks are moved radially and horizontally with respect to the axis of the crankshaft during the loading and unloading operation, the actuating supporting mechanism for the work engaging crane hooks being shown in detail in broken lines.

Figure 5 is an end elevational view, partly in section of the drive mechanism for controlling the vertical and positive movement of the work engaging crane and also the drive motor for reciprocating the crane hooks horizontally in unison.

Figure 6 is an end elevational view showing the hydraulic motor drive for imparting controlled vertical and horizontal travel to the crane hooks and showing the motor supported on the connecting rail between the control heads to travel therewith.

Figure 7 is a fragmentary plan elevational view of the control mechanism showing the manner in which the control heads are arranged in connected pairs and mounted on a pair of horizontal trackways, parts of one head being broken away as on the line 77 of Fig. 9.

Figure 8 is a fragmentary, front elevational view showing one of the control heads, parts of the head being broken away as on the line 8—8 of Fig. 7.

In the drawings, wherein for the purpose of illustrating the invention, and wherein like reference characters will be employed to designate like parts throughout the same, the reference character 5 will generally be employed to designate the base of a center drive crankshaft lathe upon which is mounted the usual center drive ring gear chuck housing 6 having the rotatable center drive work spindle 7. Movable tail stock housings 8 are likewise arranged on opposite sides of the center drive chucking device 6 which have workpiece supporting centers which are adapted to automatically move longitudinally into and out of engagement with the ends of a workpiece such as a crankshaft C in the conventional manner. Extending upwardly from the rear portion of the lathe base 5, (Figs. 1, 2 and 4) are frame members 9 and the invention embodying the loading and unloading apparatus is adapted to be supported on the end frame members 9 of the center drive lathe. Center drive lathes are shown in Patents 1,843,359, 2,069,107, and 2,623,429 and it will be unnecessary to describe the well known parts of the lathe which form no part of the invention.

The loading and unloading apparatus of the present invention embodies a pair of arms 10 having flanged portions 11 bolted to the frame members 9 as at 12. The upper ends of the arms 10 are provided with flanges 13 to which is bolted a pair of horizontal guide bars 14 and 15 (Fig. 1) and spacing members 16 are provided for the guide bars 14—15.

Slidably mounted on the horizontal guide bars 14 and 15 is a pair of control heads 19 and 20 which are connected together by means of a horizontal bar 21 so that the control heads 19 and 20 will operate in unison. The control head on the right (Fig. 1), 19 is arranged to control the crane hook in a manner to feed work to the center chucking device 6 and release itself for engaging another workpiece, while the control head 20 on the left (Fig. 1) is adapted to remove the workpiece from the chucking device 6 and unload the same to a conveyor or the like.

The control heads 19 and 20 are identical in construction and operation so a description of one will suffice for both. Each of the control heads 19 and 20 is provided with bearing bosses 23 and 24 for receiving the outer ends of actuating shafts 25 and 26. The inner ends are connected to a reduction gear unit 27 by coupling members 28 and 29 affixed to the shafts 30 and 31 of said reduction unit 27. The reduction unit 27 is of the worm and gear type having a reduction ratio of 20:1. Mounted upon a bracket 32 on the horizontal bar 21 is a hydraulic motor 33 which has its power output shaft 34 coupled to the worm shaft 35 of reduction unit 27 by means of a coupling 36. Thus it will be seen, that pressure fluid conducted to the hydraulic motor 33 by flexible pipes (not shown) will rotate the shafts 25 and 26 in the same direction at the same speed. The flexible pipes and control mechanism can be actuated in a conventional manner, and a conventional control valve on motor 33 can be provided to control the flow of pressure fluid to and from the rotary motor 33. Suitable roller engaging detents may be arranged on the horizontal slideways 14 and 15 to actuate the valve and rotate the shafts during the loading and unloading operation in a manner to move the work engaging hooks through a predetermined pathway or the valve could, of course, be manually actuated to rotate shafts 25 and 26 in either direction. The ends of the shafts 25 and 26 project into the housings 40 and 41 of the heads 19 and 20 and are provided with sprocket wheels 42 at their ends having sprocket teeth 43.

Mounted on each control head 19 and 20 at the upper portion thereof is a pair of guideway supporting rollers 44 which are held in place by pins 45. The rollers 44 engage the upper surface of the horizontal guide bar 14 while the lower horizontal guide bar 15 is engaged by a pair of rollers 46 held in place by pins 47. Additional supporting rollers 48 are secured to roller brackets 49 by pins 51, and said rollers 48 engage the rear surface of the upper horizontal guide bar 14.

The housings 40 and 41 are provided with reciprocating slides 50 (Fig. 7) having foot portions 51 to which the work engaging crane hooks 52 are adapted to be secured by machine screws 53 which pass through a head 54 in the upper end of the crane hook 52 to secure the same in place. Each of the crane hooks 52 includes a pair of horizontal arm portions 55 and 56 connected by a central portion 57. The horizontal portion 56 is provided with spaced hooked members 60 having hooked ends 61 which are adapted to engage the main bearing portions of a crankshaft C. An intermediate hook 62 has its hooked end 63 arranged to engage one of the crankshaft throw bearings. Thus, the hooks 60 will engage the main bearing portions of the crankshaft C simultaneously with the engagement of hook 62 with the intermediate throw bearing.

The mechanism for actuating the work engaging hooks and crane 57 includes the vertically reciprocating slides or bars 50 which are slidably guided within the housings 41 and 40. Each slide 50 is mounted for vertical movement in a guide plate 65 (Fig. 7) having a transversely movable slide slot 66 for receiving the slide 50. Each slide plate 65 has an integral portion 65a which is mounted between a pair of transversely disposed slide guides 67, and each slide plate section 65a is provided with opposed flanges 69 (Fig. 8) which are received in the undercut portions 70 of the slide guides 67. Thus, the reciprocating bars 50 may slide both vertically (in ways 66) and horizontally (with plates 65) by reason of the crossline arrangement. Each reciprocating plate 50 is held in the guide slot 66 by means of guide bars 71 which are bolted or otherwise affixed to the slide plate 65.

The reciprocating slides or bars 50 are provided with a series of vertically spaced sprocket pins 75 (Fig. 4) which are arranged on a line and are engaged by the sprocket teeth 43.

Each of the reciprocating bars 50 is provided with an inverted U-shaped guide slot generally designated 76 having an upper curved portion 77 and straight leg portions 78 and 79 (Fig. 4) so that the projection 80 on the sprocket wheel 42 will be received in the inverted U-shaped slot 76. It will thus be seen, that when the hydraulic motor 33 is operated and the reduction gearing 27 is causing the shafts 25 and 26 to rotate in the same direction, rotation of the sprocket wheel or gear 42 clockwisely in Figure 4 will cause the slide 50 and hook member 52 to descend, the shaft 80 traveling vertically in the outer vertical leg portion 78 so that slide 50 moves linearly downwardly until the shaft 80 reaches the transversely disposed portion of track 77. At this point the supporting slide section 65a and accordingly slide 50 will be shifted transversely to the left in Figure 4 as the shaft 80 of sprocket wheel 42 travels across transverse section 77 of the U-shaped track 76. The hook member 52 will be moved outwardly in Figure 4 with transverse travel of the slide 65, which carries vertically movable slide 50. Hence, as pinion 42 continues to rotate clockwisely and with shaft 80 disposed in the inner vertical leg section 78 of track 76 the hook member 52 will be caused to move upwardly in a different vertical plane as slide 50 is now raised by the pinion 42. If it be assumed that in Figure 4 the workpiece carrying means 52 is descending with a workpiece which is deposited in the center drive chucking mechanism 6 when the shaft 80 of pinion 43 reaches the uppermost portion of the outer vertical leg section 78 of trackway 76, then transverse movement of shaft 80 in the portion 77 of trackway 76, which causes transverse movement of the slide 65, moves the workpiece carrying means 52 transversely or radially outwardly to clear the deposited crank shaft when slide 50 and the workpiece carrying means 52 are raised empty in the different vertical plane. Shaft 80 rides in the inner vertical leg section 78 of trackway 76 until shaft 80 is disposed in the lower portion of the inner leg section 78 of track 76. The operation of the transfer means to accomplish the unloading of the crankshaft will be presently described. As the reciprocating slide 50 approaches the end of its travel, an adjustable arm 82 on the upper end of said reciprocating bar 50 is adapted to engage a limit switch 83 supported on the upper end of a bracket arm which has its lower end attached to the housing 40 or 41. By then reversing the rotation of the shaft 33 by means of the suitable reversing valve (not shown) which is actuated by the limit switch 83, the shafts 25 and 26 will rotate in a reverse direction to restore the reciprocating slide 50 to its initial position.

A housing 86 is affixed to each of the control heads 40 and 41 by means of suitable machine screws, and said housing is adapted to enclose the upper end of the reciprocating bar 50 and the limit switch mechanism 83.

The loading and unloading apparatus is adapted to be shifted longitudinally along the horizontal trackways 14 and 15 by means of a reversible control motor 100 (Figs. 3 and 5) mounted on a bracket 101 attached to a plate 102 connecting the rear faces of the slide bars 14 and 15. Machine screws 103 are provided for securing the bracket 101 to the plate 102, and the upper portion of said plate 102 is provided with a gear housing 104 having a shaft 105 provided with a worm wheel 106 which is driven by motor 100. The housing 104 is provided with suitable bearings for said shaft 105. The hydraulic motor shaft 110 is drivingly connected to a worm 111 (Fig. 5) by means of a coupling 112. The worm 111 drivingly engages the worm wheel 106 and is adapted to rotate a gear wheel 114 on the outer end thereof which is disposed in a position to engage a rack bar 115 secured to the rear of the horizontal frame member 21 by means of machine screws 116. Thus, when the hydraulic motor 100 is operated in one of its two directions of rotation, the loading assembly including the horizontal frame 21 and control heads 19 and 20 on the ends thereof will travel longitudinally along the horizontal supporting bars 14 and 15. This travel may be controlled by the valve which is adapted to admit pressure fluid to the motor 100 in such a manner as to rotate said motor in either direction of rotation. For instance, when the loading mechanism has reached one end of its travel on the horizontal bars 14 and 15, it will be reversed after a time lapse permitting sufficient time for the crankshaft engaging hooks 60 and 62 to engage and disengage a crankshaft during the loading and unloading operation.

The various manual control switches S may be placed in front of the lathe within easy reach of the operator so that he can control the operation of the lathe and the infeeding of its tools.

For an understanding of the operation of the loading and unloading mechanism, attention is directed to Figure 1. It is intended that crankshafts in their rough condition be placed on the usual rack conveyor R at the right side of the lathe so that the right end hooks 60 and 62 carried by housing 40 will pick the crankshaft up and feed it to the left to the center drive chucking device 6. At the same time that the hooks 60 and 62 are picking up a crankshaft for loading, the hooks 60 and 62 on the crane 57 carried by housing 41 will remove a crankshaft from the center lathe chucking device 6. Thus, while the crane 57 on the right hand side is loading a workpiece, the crane 57 on the left hand side of the machine is unloading a workpiece. The hooks 60 on the left hand side are the same as on the right hand side, but the hooks 62 are arranged in reverse order, it being noted that the left and right hand cranes 57 are reversed in position because the hooks 62 must be positioned to engage the same offcenter crankshaft throw bearing of the crankshaft C since its relative position is the same during the loading operation.

If it be assumed that the hook members 52 and the mechanism is in the position in which it is shown in Figure 4 with the control head 40 opposite the center drive chucking mechanism 6 and the control head 41 opposite the left hand rack R in Figure 1, with the hook member 52 carried by control head 40 carrying a rough workpiece and the hook member 52 carried by control head 41 carrying a machined workpiece which has been removed from the center drive chucking mechanism 6, then with pinion 42 in the position in which it is indicated in Figure 4, and following the cycle which was previously described, the rough workpiece will be deposited in the center drive chucking mechanism 6 and the machined workpiece will be deposited in the left hand rack R, following which the slide 50 will be returned to raised position. At this time the pinions 42 will be disposed in the lower terminal portions of the inner vertical leg sections 78 of trackways 76. The hooks will be in "up" position but will be outward of the axes of the tail stock supporting spindles. Motor 100 will then be operated to move the assembly 21 carrying heads 40 and 41 to the right in Figure 1 (through worm 111, worm wheel 106, pinion 114, and rack 115) until the right hand hook member 52 is disposed opposite the right hand rack R in Fig. 1 and the left hand hook member 52 carried by control head 41 is disposed opposite the center drive chucking mechanism 6. If pinion 42 is then turned counterclockwisely as viewed from its right end in Figure 4, and the other pinion 42 is also so turned, the empty hook members 52, which are outward of the axes of the crank shafts in the right hand rack R and in center drive chucking mechanism 6, will be moved downwardly until the projecting shafts 80 reach the upper portions of the inside vertical legs 78 of their respective trackways 76. Thence slides 65 which carry the slides 50 and hook members 52 will be caused to move laterally inwardly until the hooks which have been carried downwardly below the portions of the crank shafts which they will engage are disposed under these portions of the crank shafts. Continued counterclockwise rotation of the pinions 42 will cause upward movement of slides 50 and work engaging members 52 and will lift the crank shafts upwardly in a different vertical plane than that in which they descended, until the crank shafts are in raised position. Thence motor 100 will be actuated in the opposite direction to move the carriage 21 to the left until the hook member 52 carried by control head 40 is opposite center drive chucking mechanism 6 and the hook member 52 carried by control head 41 is opposite a left hand rack R. This completes the cycle.

It will be observed that a pair of projecting arms 82 are provided for actuating the limit switch 83 to cause a reversing valve not shown to change the direction in which shafts 25 and 26 will be revolved. The electrical and hydraulic control system which is conveniently used with the machine and forms no part of the instant invention is not shown. Clearly, the various elements could be moved manually in the sequence described, by the operator, in which case no hydraulic or electrical control system would be necessary, or a separate, reversible electrical motor could be used in place of each of the hydraulic motors shown, which the operator could actuate to turn in the direction desired by simply pressing control buttons. Any of these systems are conventional but since the various parts could be moved manually it is not deemed necessary to show a control system.

The various control mechanisms for the horizontal sliding movement control of the casings 19 and 20 is likewise not shown, but limit switches 125 and 126 (Figure 1) are supported by the top slide bar 14 and are adapted to be engaged by adjustable arms 127 and 128 carried by the respective heads 19 and 20. The limit switches 125 and 126 may control a reversing valve to reverse the flow of pressure fluid to the control motor 100.

It is to be understood that the form of the invention herewith shown and described is to be taken as a preferred embodiment of the invention and that various changes in the shape, size and arrangement of parts may be resorted to without departing from the spirit of the invention or the scope of the subjoined claims.

What we claim is:

1. In a work transfer mechanism for loading and unloading a workpiece from a lathe; a carriage; means mounting said carriage for movement longitudinally; slide means on said carriage mounted for transverse to and fro movement; a slide on said slide means mounted for movement perpendicularly to said slide means for to and fro movement vertically; a workpiece carrying member mounted fast on said vertically movable slide; a movement controlling surface on said vertically movable slide having a vertically extending portion and a transversely extending portion; and a revolvable drive part in axially fixed position on said carriage having a section thereof in engagement with said movement controlling surface and causing movement of said vertically movable slide vertically and movement of said transversely movable slide means transversely to provide both vertical movement and transverse movement of said workpiece carrying means.

2. The combination defined in claim 1 in which said movement controlling surface is an inversely disposed U-shaped track on said slide disposed in a transverse plane and providing sequentially linear vertical movement of said vertically movable slide, transverse movement of said transversely movable slide means, and return linear vertical movement of said vertically movable slide in a different vertical plane because of said transverse movement.

3. The combination defined in claim 2 in which a vertically extending row of lugs are provided between the vertically extending leg sections of the U-shaped track and said drive part comprises a pinion in mesh with said lugs, mounted on a longitudinal shaft which extends into said track.

References Cited in the file of this patent

UNITED STATES PATENTS

| | | |
|---|---|---|
| 1,302,861 | Schott | May 6, 1919 |
| 1,634,460 | Gray | July 5, 1927 |
| 1,827,248 | McClurkin | Oct. 13, 1931 |
| 1,993,754 | Smith | May 12, 1935 |
| 2,074,809 | Rose | Mar. 23, 1937 |
| 2,221,049 | Groene | Nov. 12, 1940 |
| 2,305,868 | Groene | Dec. 22, 1942 |
| 2,623,429 | Meyer et al. | Dec. 30, 1952 |
| 2,653,502 | Myer et al. | Sept. 29, 1953 |
| 2,677,471 | Skinner | May 4, 1954 |
| 2,746,613 | Meyer | May 22, 1956 |